Jan. 30, 1968 A. J. CIVITELLO 3,366,018
APPARATUS FOR AND METHOD OF MANUFACTURING MULTI-PLY BAGS
Original Filed March 19, 1965 5 Sheets-Sheet 1

Fig.1·A

INVENTOR
ANTHONY J. CIVITELLO

BY Walter H. Beland
AGENT

Jan. 30, 1968   A. J. CIVITELLO   3,366,018
APPARATUS FOR AND METHOD OF MANUFACTURING MULTI-PLY BAGS
Original Filed March 19, 1965   5 Sheets-Sheet 4

INVENTOR
ANTHONY J. CIVITELLO

BY Walter H. Beland
AGENT

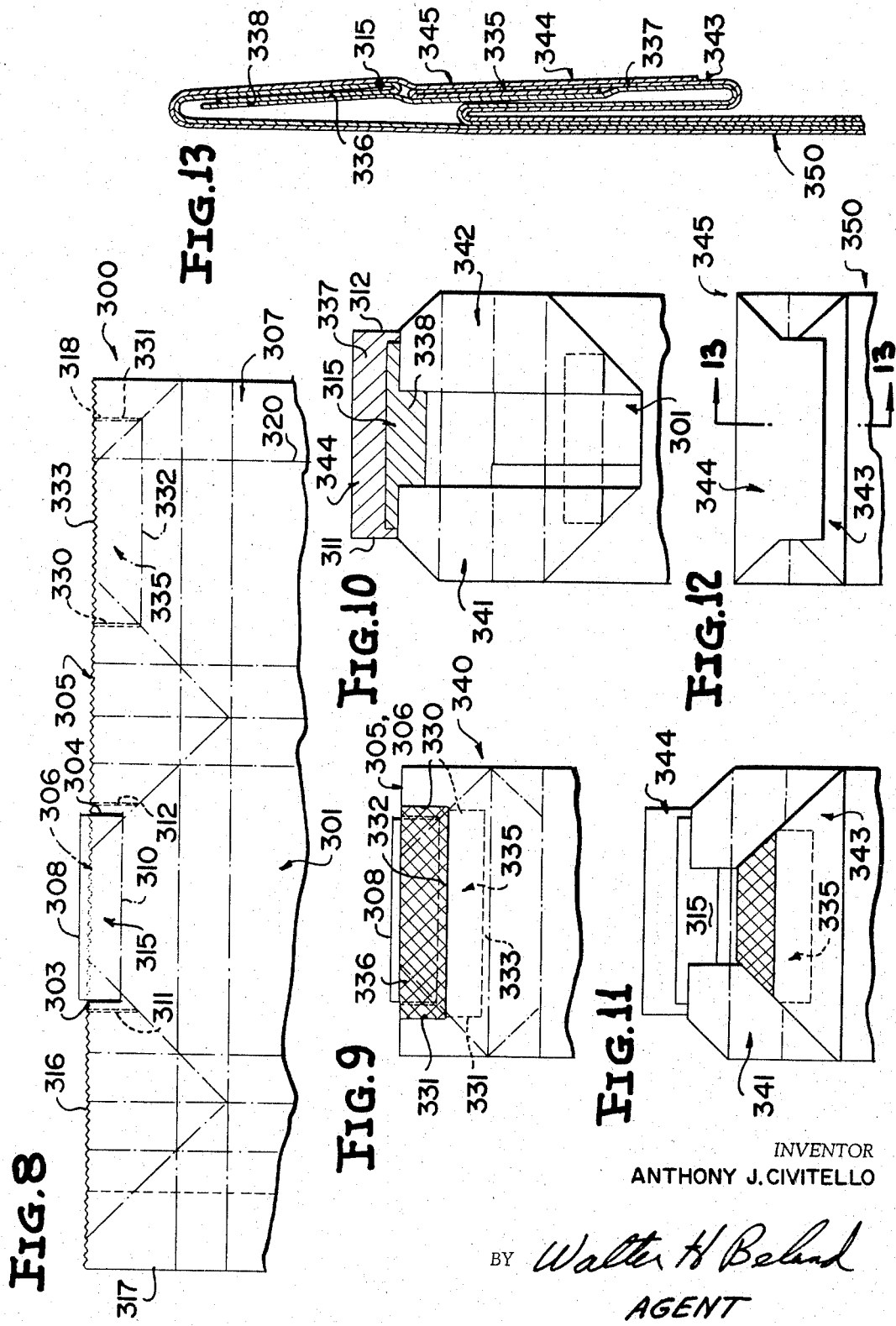

United States Patent Office 3,366,018
Patented Jan. 30, 1968

3,366,018
APPARATUS FOR AND METHOD OF MANUFACTURING MULTI-PLY BAGS
Anthony J. Civitello, Malvern, Pa., assignor to Continental Can Company, Inc., New York, N.Y., a corporation of New York
Original application Mar. 19, 1965, Ser. No. 441,175, now Patent No. 3,289,915, dated Dec. 6, 1966. Divided and this application Aug. 29, 1966, Ser. No. 575,720
13 Claims. (Cl. 93—14)

This is a division of my copending commonly assigned application Ser. No. 441,175 filed Mar. 19, 1965, now Patent No. 3,289,915, issued Dec. 6, 1966.

This invention relates to improvements in paper bags of the multi-ply type which generally include at least an outer wrapper and an inner liner, and is particularly directed to a novel apparatus for and a method of fabricating multi-ply bags having bottom constructions formed by adhesively securing together a plurality of closure flaps in a manner unprovided for by known bag manufacturing apparatuses and methods to form a stronger and more efficient bag construction than has been heretofore available.

The most simple conventionally fabricated multi-ply bag is a two-ply structure having an inner liner and an outer wrapper. Such a bag is customarily fabricated from two separate but continuous webs. The invention is particularly concerned with the specific type of multi-ply bag wherein the web forming the liner is of a grease-resistant, moisture-proof material while the web forming the wrapper is of a heavy-gage paperstock material to provide the requisite bag strength. The two separate webs of material are drawn simultaneously from two separate rolls and are fed by a conveyor mechanism in parallel, seuperimposed, relationship at identical speeds on the order of 200–300 feet per minute.

It is customary to feed the two webs in a manner in which one of the webs is transversely offset with respect to the other. That is, a longitudinal edge of one of the webs extends transversely beyond a longitudinal edge of the other of the webs. The purpose for this transverse offset is to form staggered longitudinal seams in bags formed from the webs which, due to the staggered relationship, reinforce the bags and provide a tortuous path for material tending to sift out of the inner liner through the outer wrapper of each so-formed bag.

The rapidly advancing webs are drawn through an adhesive applying mechanism which applies adhesive to the two webs to form a single two-ply web having staggered longitudinal edges.

A shear or die intermittently traverses the adhesively joined two-ply web and severs the web into two consecutive blank assemblies having top and bottom transverse edges. Each individual blank assembly is formed into a tube and the longitudinal edges of each ply are adhesively joined together to form the staggered longitudinal seams of the bags. The bottom of the tube is then folded in any one of a variety of different ways to complete the fabrication of the bag.

In all such prior art multi-ply bags with no known exceptions, the inner coated suface of the liner at one flap is brought into overlying adhesive contact with an outer surface of the wrapper at another flap to form the final closure of the bag bottom construction. Because the inner surface of the liner is coated with, for example, polyethylene or other relatively impermeable material, the water of conventionally employed water-based adhesives is not absorbed by the coated inner liner resulting in excessive setting up time for the manufacture of such bags. In addition, the impermeable and generally non-wettable nature of such coatings on the liners prevent the adhesive from effectively adhering to the liner and thus precludes the formation of a strong seal between the liner and that portion of the wrapper to which the liner flap is overlaid.

It is, therefore, a primary object of this invention to provide an improved multi-ply bag having a bottom construction of the type which includes an outer wrapper and an inner liner formed into overlying inner and outer closure flaps, a portion of the liner of the outer closure flaps being folded upon itself to expose an inner surface of the outer wrapper of the outer closure flap and an outer surface of the liner to the outer surface of the inner closure flap whereupon adhesive applied to these surfaces provides an efficient and strong bottom construction by effecting an adhesive bonding between only uncoated paper surface portions of the inner and outer closure flaps.

A further object of this invention is to provide a novel multi-ply bag of the type which includes an inner liner and an outer wrapper, the bag being particularly characterized in a bottom construction including a first folded inner closure flap and an overlying outer closure flap, the outer closure flap including a pair of slits in the inner liner terminating at a bottom edge of the bag and defining with a fold line a generally rectangular flap section, the flap section being folded away from the bottom edge of the bag to expose an inner surface portion of the wrapper of the outer closure flap and an outer uncoated surface portion of the inner liner, and adhesive securing these uncoated surface portions to the inner closure flap to the exclusion of coating material on the inner surface of the liner whereby an efficient and strong seal of the bag bottom is effected.

A further object of this invention is to provide a novel apparatus for forming multi-ply bags of the type described including means for feeding at least an inner web and an outer web in a predetermined direction of travel along a predetermined path, severing means positioned adjacent the inner web for forming a foldable flap section in the inner of the webs, means for deflecting the flap section from the plane of the inner web prior to the formation of the webs into a multi-ply bag, and means for forming the webs into a multi-ply bag having a bottom construction which includes inner and outer closure flaps with the foldable flap section forming a portion of the outer closure flap and exposing uncoated portions of the liner thereof to the inner closure flap during the formation of the bag bottom.

A further object of this invention is to provide a novel method of forming a multi-ply bag of the character described by performing the steps of advancing inner and outer webs along predetermined paths in predetermined directions of travel, slitting the inner web to form therein a generally rectangular foldable flap section, creasing the flap section along a line normal to the direction of travel to cause the flap section to deflect out of the plane of the inner web, folding the flap section in a direction opposite to the direction of travel of the webs, and forming the webs into a bag having a bottom construction formed of an inner closure flap and an outer closure flap with the foldable section forming a portion of the outer closure flap and exposing uncoated surface portions of the liner in the area of the outer closure flap to the inner closure flap to effect an extremely strong adhesive seal between the closure flaps.

With the above and other objects in view that will hereinafter appear, the nature of the invention will be more clearly understood by reference to the following detailed description, the appended claims and the several views illustrated in the accompanying drawings.

In the drawings:

FIGURES 1–A and 1–B are fragmentary diagrammatic perspective matching views of an apparatus constructed in accordance with this invention, and illustrate means for forming a plurality of foldable flaps in a liner web in accordance with a preferred from of this invention and also shows similar foldable flaps being formed in a wrapper web in accordance with another embodiment of the invention prior to the unification of the webs into a two-ply web and the formation thereof into multi-ply bags.

FIGURE 8 is a fragmentary top plan view of another blank assembly, similar to the blank assembly of FIGURE 2, and illustrates flaps formed in a bottom area of both an inner liner and an outer wrapper.

FIGURES 9 through 12 are fragmentary top plan views of the blank of FIGURE 8 after the same has been folded into tubular form, and progressively graphically depict the folding of the composite tube to form the finally completed bag bottom construction of FIGURE 12.

FIGURE 13 is an enlarged fragmentary sectional view taken along line 13—13 of FIGURE 12, and illustrates the foldable flaps of inner and outer closure flaps of the bags folded to achieve an adhesive bonding of the bag bottom to the exclusion of coating material on an inner surface of the inner liner.

Figure 1:
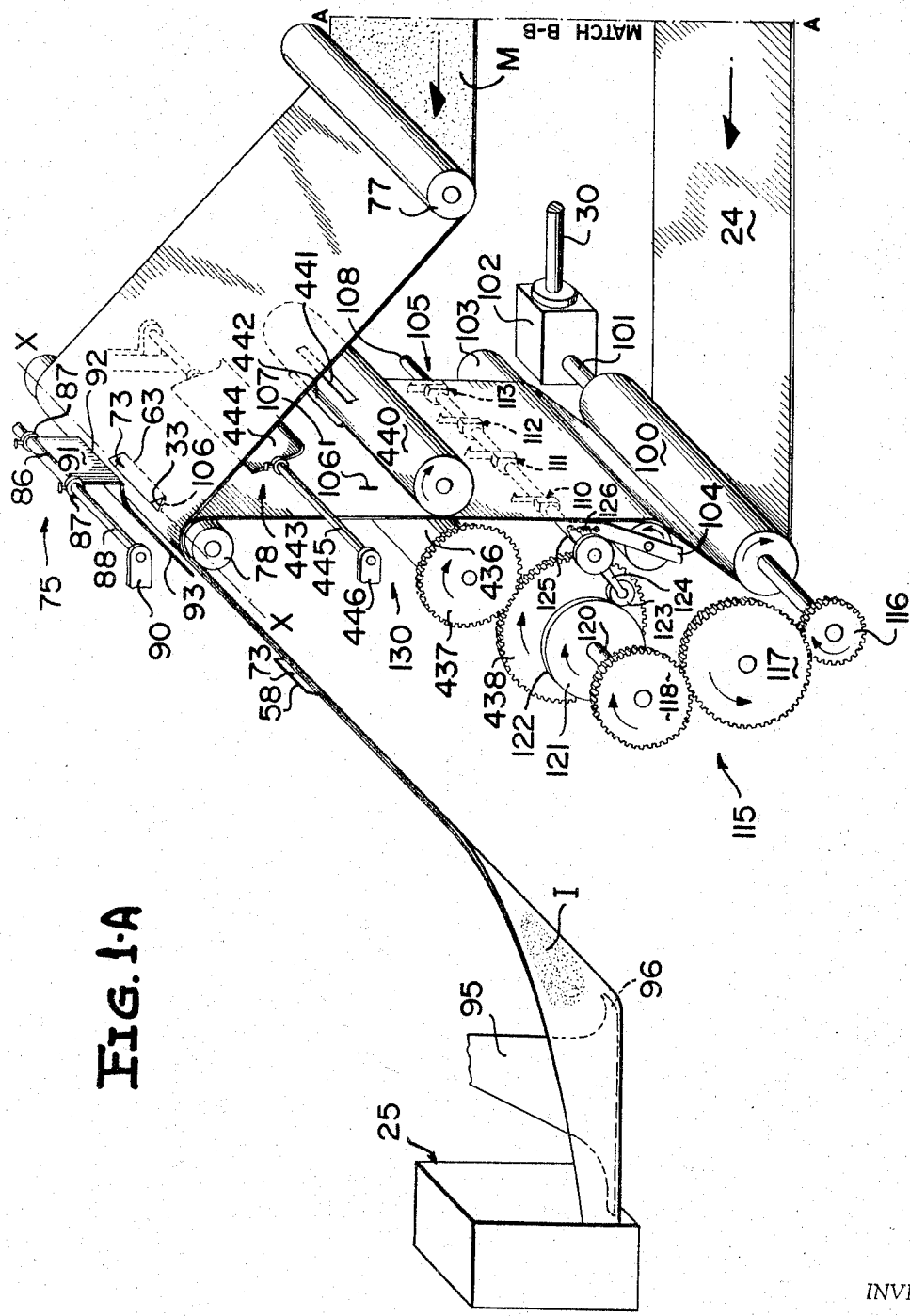

Referring to FIGURES 1–A and 1–B of the drawings, an apparatus constructed in accordance with this invention is generally referred to by the reference numeral 20 and includes means (not shown) for supporting a roll 21 of liner material from which a liner web 22 is drawn and fed by means (also not shown) from right-to-left as viewed in these figures, and a roll 23 of outer or wrapper material from which an outer wrapper web 24 is drawn and advanced. The inner or liner web 22 and the outer or wrapper web 24 are fed in the direction of the headed arrows of FIGURES 1–A and 1–B at synchronous speeds toward a conventional bag bottom forming machine 25 (FIGURE 1–A) which forms the webs 22, 24 into bags in a manner to be described more fully hereafter.

The liner web 22 is of a grease-proof type which may be, for example, paperstock material coated upon an inner surface with polyethylene or similar coating material M indicated by stippling in FIGURES 1–A and 1–B. The liner web 22 is drawn beneath the periphery of a driven roll 26 having a shaft 27 coupled at one end portion to a conventional universal gear box 28. A main shaft 30 rotates the shaft 27 and the roller 26 in a clockwise direction as viewed in FIGURE 1–B to impart similar clockwise rotation to a gear 31 carried by an end portion of the shaft 27 opposite the gear box 28. The shaft 27, as well as other shafts and components of the apparatus 20 to be described hereinafter, is mounted in a conventional manner to the framework (not shown) of the apparatus 20.

The liner web 22 is drawn beyond the roller 26 and beneath a cyclically operated first severing means 32 which forms a pair of slits 33, 34 in the liner web 22 in substantially parallel relationship to each other and to longitudinal edge portions (unnumbered) of the liner web 22. The severing means 32 comprises a plurality of cutters 35–38 carried by a shaft 40 pivotally supported at opposite ends thereof to the framework (not shown) of the apparatus 20. The cutters 35 through 38 are identical and each includes a split collar 41 axially and circumferentially adjustable on the shaft 40 and secured in any relative position on the shaft 40 by a fastener 42 in a conventional manner. Each of the collars 41 carries a blade 43 having a cutting edge (unnumbered) directed toward and normally spaced from the liner web 22.

The slits 33, 34 are formed by the cutters 35, 36 each time the shaft 40 is rocked in a counterclockwise direction in a manner to be described more fully hereinafter. In accordance with a preferred form of the invention, the cutters 37, 38 and the blades 43 carried thereby are adjusted to a position by the fasteners 42 to prevent the formation of slits in the web 22 except in a manner to be later described in the consideration of a secondary embodiment of the invention.

The first severing means 32 is actuated by drive connecting means 45 coupled to the gear 31 secured to the shaft 27. The drive connecting means 45 includes a gear 46 in mesh with the gear 31 and a gear 47 carried by a shaft 48 journalled in a conventional manner to the framework (not shown) of the apparatus 20. The shaft 48 carries an eccentric or cam 50 having a cam surface 51 along which rides a cam follower 52 in the form of a roller carried by an arm 53 fixed to the shaft 40. The arm 53 is normally biased in a counterclockwise direction as viewed in FIGURE 1–B of the drawings by a spring 54 connected between an integral portion 55 of the arm 53 and a portion 56 of the apparatus framework. When the high side of the cam 50 is in contact with the cam follower 52 the blades 43 of the cutters 35, 36 are maintained out of contact with the liner web 22. However, as the low side of the cam 50 contacts the follower 52, the arm 53 is rocked momentarily in a counterclockwise direction by the springs 54 to form the slits 33, 34 in the liner web 22.

The drive connecting means 45 also imparts movement to a second severing means 57 which forms a slit 58 between the slits 33, 34 and generally normal thereto.

The second severing means 57 includes a roll 60 carrying a cutting blade 61. The cutting blade 61 is of a length generally equal to the desired length of the slit 58 and is adjustably mounted in a conventional manner on the roll 60 for securement in any axial desired position, and is also preferably adjusted by means not shown for spacing the blade 61 at a selected annular relationship relative to creasing means 62 in the form of a creasing blade similarly adjustably carried by the roll 60 in generally parallel relationship to the blade 61. The creasing blade 62 forms a crease line 63 between the slits 33, 34 as shown in FIGURE 1–B of the drawings. The blades 61 and 62 cooperate with a back up roll 64 underlying the liner web 22 adjacent the roll 60. The back up roll 64 preferably includes a rubber or similar elastic insert against which the blades 61, 62 contact after respectively penetrating the liner web 22 to form the slit 58 and bearing against the liner web to form the crease or fold line 63. The roll 64 is driven by a gear 65 carrier by the shaft 48 of the drive connecting means 45 and a gear 66 connected to one end of a shaft 67 of the roll 64. An opposite end of the shaft 67 carries a gear 68 in mesh with a gear 70 carried by a shaft 71 of the roll 60 to effect rotation of the rolls 64 and 60 in the directions indicated by the headed arrows in FIGURE 1–B.

During the rotation of the roll 60 by the drive connecting means 45 in the manner clearly illustrated in FIGURE 1–B, the slit 58 is first formed between the slits 33, 34 freeing a leading edge of a generally rectangular foldable flap or section 72 of the liner web 22. This foldable flap or section 72 is thereafter deflected slightly out of the plane of the liner web 22 as shown in FIGURE 1–B by the formation of the crease or fold line 63. This deflection of the foldable flap 72 out of the plane of the liner web 22 allows the flap 72 to be reversely folded in a direction opposite to the direction of web travel about the fold line 63 by folding means 75 (FIGURE 1–A) to be described more fully hereafter.

After the web 22 has been slit and creased to form the foldable flap 72 and a plurality of additional identical flaps all referred to by the reference numeral 73 have been formed, the web is guided over a roll 74, beneath a roll 76, beneath another roll 77, and over a roll 78 at which the inner web 22 is united with the outer web or wrapper 24. An adhesive applying mechanism 80 (FIGURE 1–B) of a conventional construction is positioned beneath and slightly downstream of the roll 76. The adhesive applying mechanism includes a reservoir 81 housing suitable watersoluble adhesive A in which is immersed a roll 82 rotatable in a clockwise direction by a driving connection with the main shaft 30 (not shown). A metering roll 83 meters the adhesive A upon the periphery of the roll 82 which is thereafter transferred to an applicator roll 84 in a desired pattern. The desired pattern of adhesive on the applicator roll 84 is transferred to the uncoated surface (unnumbered) of the liner web 22 for subsequently adhering the liner web 22 to the wrapper web 24 upon unification thereof at the roll 78.

The folding means 75 (FIGURE 1–A) includes an angular plate member 86 fixed to adjustable collars 87 which are in turn adjustably secured to a shaft 88 by radial set screws (unnumbered). The shaft 88 is in turn fixed to a portion 90 of the framework (not shown) of the apparatus 20. The plate member 86 includes a plate portion 91 positioned generally normal to the axis of the roller 78 and joined by an integral edge 92 to a plate portion 93 contoured to the configuration of the liner web 22 as it contacts, passes about and passes beyond the roll 78. The edge 92 of the plate member 86 if positioned slightly above the upper coated surface of the liner web 22 and beneath the leading edge of the foldable flaps 72, 73 defined by the slit 58. As the foldable flaps 72, 73 contact the edge 92 of the angular plate member 86, these flaps are folded in a generally clockwise direction about their associated crease or fold lines 63 and are urged to a plane generally parallel to the plane of the liner web 22 by the plate portion 93. However, upon passing beyond the portion 93 of the plate member 86 the foldable flaps 72, 73 rebound slightly, as shown by the leftmost flap 73 of FIGURE 1–A, due to the natural resiliency of the material from which the liner web 22 is constructed. Thus, as each of the foldable flaps 72, 73 pass beyond the folding means 75, the fold lines 63 associated with each foldable flap are leading while the slit or edge 58 of each flap is in a trailing position. Each of the foldable flaps 72, 73 is assured of being maintained in this position by a plow or former 95 having a curved edge 96 aligned with the flaps 72, 73. As the flaps 72, 73 pass beneath the curved leading edge 96 of the plow 95, the flaps 72, 73 are intimately urged into overlying relationship to the liner web 22 as the liner web 22 and the wrapper web 24 are formed about the former 95 toward a tubular configuration prior to being fed into the mechanism 25.

The outer wrapper web 24 is operated upon by the apparatus 20 in much the same manner as the liner web 22. However, as opposed to the liner web 22, the wrapper web 24 is uncoated upon an innermost surface thereof (the upper surface of FIGURE 1–B) and carries indicia I (FIGURE 1–A) indicated by the stippling which may, for example, be in the form of printed matter, advertising, etc. The wrapper web 24 is guided by pairs of rolls 97, 98 (FIGURE 1–B) beneath the periphery of a roll 100 corresponding to the roll 26 beneath which the liner web 22 is drawn. The roll 100 is rotated in the direction of the headed arrow by the driving connection of its shaft 101 with the main shaft 30 through a conventional gear box 102. After passing beyond the periphery of the roll 100, the wrapper web 24 is guided to a generally vertical plane by a roll 103 journaled by a shaft (unnumbered to a portion 104 of the apparatus framework (not shown). As the wrapper web 24 is drawn between the roll 103 and the roll 78, first severing means 105 are operative to form a pair of slits 106, 107 in the outer wrapper 24.

The severing means 105 is substantially identical to the severing means 32 and includes a shaft 108 carrying a plurality of cutting means or cutters 110–113 each identical to the cutters 35–38 of the first severing means 32, and a description of the former is therefore considered unnecessary for a complete understanding of this invention. However, it will be noted that the slitters or cutters are four in number but only two are operative to form the pair of slits 106, 107 and the distance between the cutters forming the slits 106, 107 is further than the distance between the cutters 35, 36. Thus, the slits 33, 34 are positioned between the slits 106, 107 as will appear more fully hereafter.

The severing means 105 is cyclically operated by drive connecting means 115 including a gear 116 carried by an end portion (unnumbered) of the shaft 101 remote from the gear box 102. The gear 116 is in mesh with a gear 117 which in turn meshes with and drives a gear 118 fixed to a shaft 120 suitably journaled in the framework of the apparatus 20. The shaft 120 carries a cam 121 having a cam surface 122 upon which rides a cam roller or follower 123 rotatably fixed to an arm 124. The arm 124 is fixed to the shaft 108 and an opposite end portion 125 of the arm 124 is biased by a spring 126 fixed to the portion 104 of the framework for normally urging the shaft 108 and the cutters 110–113 fixed thereto in a clockwise direction as viewed in FIGURES 1–A of the drawings. As the cam follower or roller 123 approaches the low side of the cam, the spring 126 rocks the shaft 108 clockwise and the cutters 110, 111 form the slits 106, 107 respectively.

The apparatus 20 also includes severing means 130 downstream from the severing means 105, but in a preferred form of this invention, the severing means 130 are inoperative and no cutting of the outer wrapper web 24 thereby is effected. The severing means 130 will, therefore, be more fully described hereinafter.

After the slits 106, 107 have been formed in the outer wrapper web 24 and the outer wrapper web 24 has been united with the adhesively coated liner web 22, the two-ply web is folded by the former 95 toward a tubular configuration and the bottom formed by the bottom forming mechanism 25. The eventual line of cut-off indicated by the line X—X of FIGURE 1–A, and depending upon the particular construction of the mechanism 25 and/or the former 95, the adhesively joined webs 22, 24 can either be consecutively cut along the line X—X prior to being formed into a generally tubular configuration or after a tube has been formed therefrom, with the latter being the preferred construction.

Figure 2:
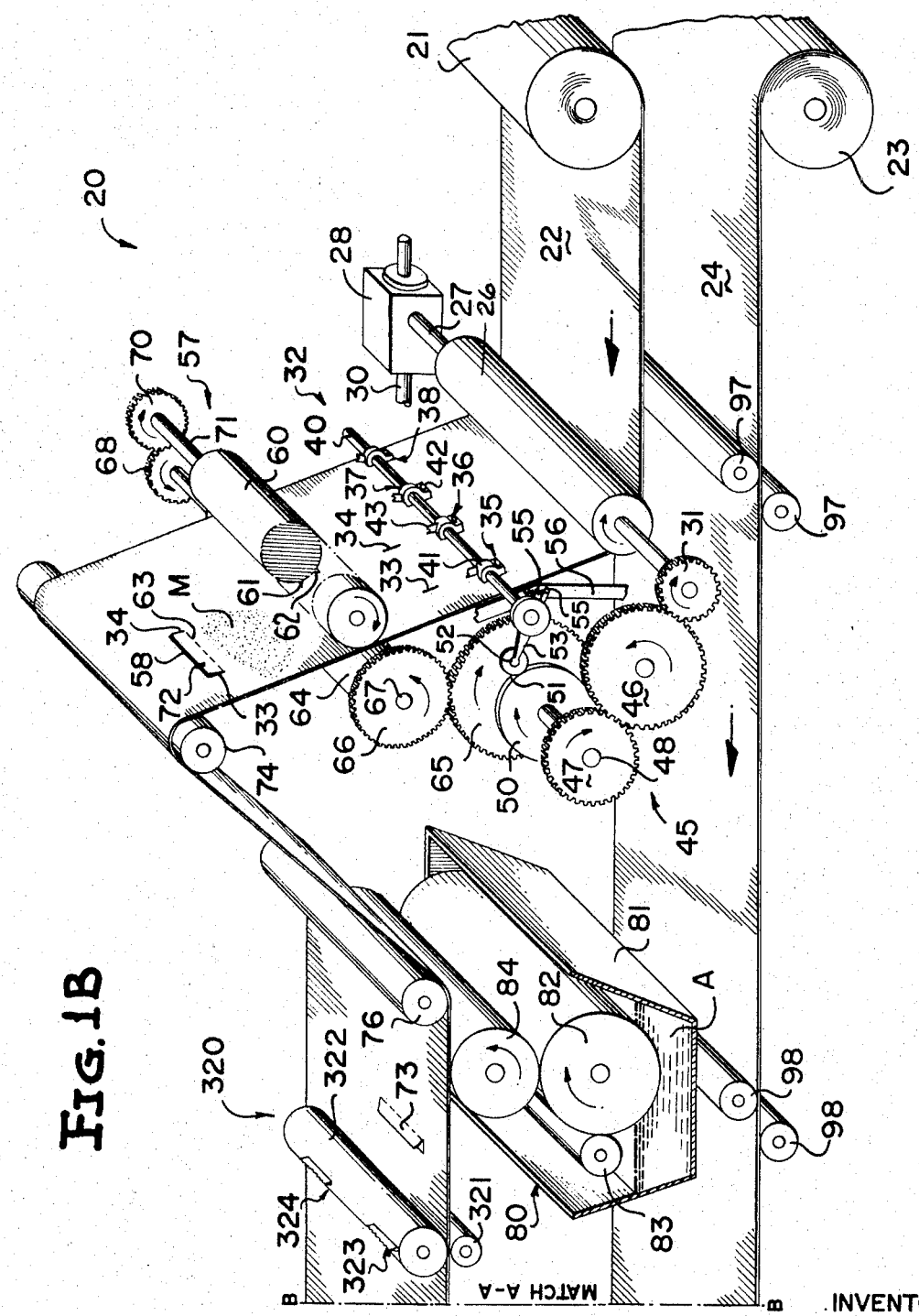
FIGURE 2 is a top plan view of a blank assembly of this invention, and illustrates a liner blank overlying a wrapper blank and a foldable flap formed in the bottom area of the liner blank.

The mechanism 25 is, as was heretofore noted, conventional in consrtuction and may form either a square bottom construction or a satchel bottom construction from the webs 22, 24. In accordance with this invention a square bottom construction is formed in each multiply bag formed from each blank assembly (FIGURE 2) generally referred to by the reference numeral 140 formed upon the severance of the webs 22, 24 along the consecutive line of severance X—X. Each blank assembly constructed in accordance with this invention includes a liner blank 142 formed from the material of the liner web 22 and a wrapper blank 144 formed from the material of the outer wrapper web 24. The liner blank 142 is illustrated in FIGURE 2 above the wrapper blank 144 with the coating material M being exposed.

The liner blank 142 is of a generally rectangular configuration and comprises a pair of longitudinal edge 145, 146 a top or trailing edge 147 and a bottom or leading edge 148 formed when the webs 22, 24 are severed along the severance line X—X of FIGURE 1–A. The wrapper blank 144 is similarly substantially rectangular in outline and includes longitudinal edges 150, 151 staggered with respect to the respective longitudinal edges 145, 146 of the liner blank 142, a top edge 152, and a bottom edge 153. The blanks 142, 144 are illustrated as a tubular assembly 160 in FIGURE 3 to clearly illustrate the adhesive A applied by the adhesive applying mechanism 80 of FIGURE 1–B securing the overlapped edges 145, 146 of the liner blank to each other and similar adhesive A' applied by conventional means (not shown) between the overlapped edges 150, 151 of the wrapper blank 144. Adhesive is also positioned between the blanks 142, 144 at the shaded areas 155, 156 adjacent the bottom edges 148, 153 and the shaded area 157 adjacent the top edges 147, 152 to maintain the blanks 142, 144 in assembled relationship during the formation thereof into the tube or tube assembly 160 and the subsequent formation of the latter into a multi-ply square bottom bag shown completely formed in FIGURE 6 and referred to by the reference numeral 200.

The liner blank 142 includes three longitudinal fold lines 161, 162 and 163 which overlie corresponding longitudinal fold lines 164, 165 and 166 respectively in the wrapper blank 144. The fold lines 161–166 form one of a pair of side gussets 167 in the tube 160 as well as the multi-ply bag 200. Similar longitudinal fold lines 171, 172 and 173 of the liner blank 142 overlie and are in alignment with respective longitudinal fold lines 174, 175 and 176 of the wrapper blank 144. The fold lines 171–176 are foldable in a conventional manner to form a side gusset 177 of the tube 160 and the bag 200 in a well known manner.

A front wall 168 of the liner blank 142 is disposed between the fold line 173 and the fold line 161 while a similar front wall 178 of the outer blank 144 is disposed between the fold line 176 and the fold line 164.

A rear wall 180 of the liner blank 142 is defined between the fold lines 171, 163 while a similar rear wall 181 (FIGURE 7) of the wrapper blank 144 is set off between the fold lines 166 and 174.

A pair of transverse fold lines 182, 183 in the liner blank 142 overlie respective transverse fold lines 184, 185 of the wrapper blank 144. The fold lines 182, 193 extend between the longitudinal edges 145, 146, while the fold lines 184, 185 extend between the longitudinal edges 150, 151.

A pair of fold lines 186, 187 of the liner blank 142 diverge from the intersection of the fold lines 162, 182 at an angle of approximately 90 degrees and terminate at the bottom edge 148. The fold lines 186, 187 overlie corresponding fold lines 190, 191 respectively of the wrapper blank 144.

Another pair of fold lines 192, 193 of the liner blank 142 diverge from the intersection of the fold lines 172, 184 at an angle of approximately 90 degrees and terminate at the bottom edge 148 of the liner blank 142. The fold lines 192, 193 overlie respective fold lines 194, 195 of the wrapper blank 144.

A fold line 197 of the wrapper blank 144 extends between the juncture of the longitudinal edge 151 and the fold line 185 to the bottom edge 153 of the wrapper blank 144 at a point at which the longitudinal edge 146 of the liner blank 142 merges with the bottom edge 148 thereof.

The liner blank 142 is provided with a pair of slits 203, 204 opening outwardly through the bottom edge 148. The slits 203, 204 correspond to the respective slits 33, 34 in the liner web 22 (FIGURE 1–B), while an edge portion 205 of the bottom edge 148 corresponds to the edge formed by the slits 58. A fold or crease line 206 in spaced parallel relationship to the edge portion 205 corresponds to the crease or fold line 63 of the liner web 22, and defines with the slits 203, 204 and the edge portion 205, generally rectangular foldable flap or section 207 corresponding to the foldable flaps 72, 73 of FIGURES 1–A and 1–B of the drawings.

The wrapper blank 144 includes a pair of slits 216, 217 corresponding to the slits 106, 107 formed in the wrapper web 24 (FIGURE 1–A). The slits 216, 217 similarly open outwardly of the bottom edge 153 of the wrapper blank 144, and are both spaced further apart from each other and are longer than the slits 203, 204 of the liner blank 142. The slits 216, 217 define a flap portion 218 with an edge portion 219 of the wrapper blank edge 153 which is generally larger in area than the foldable flap 207 of the liner blank 142.

Figure 3:
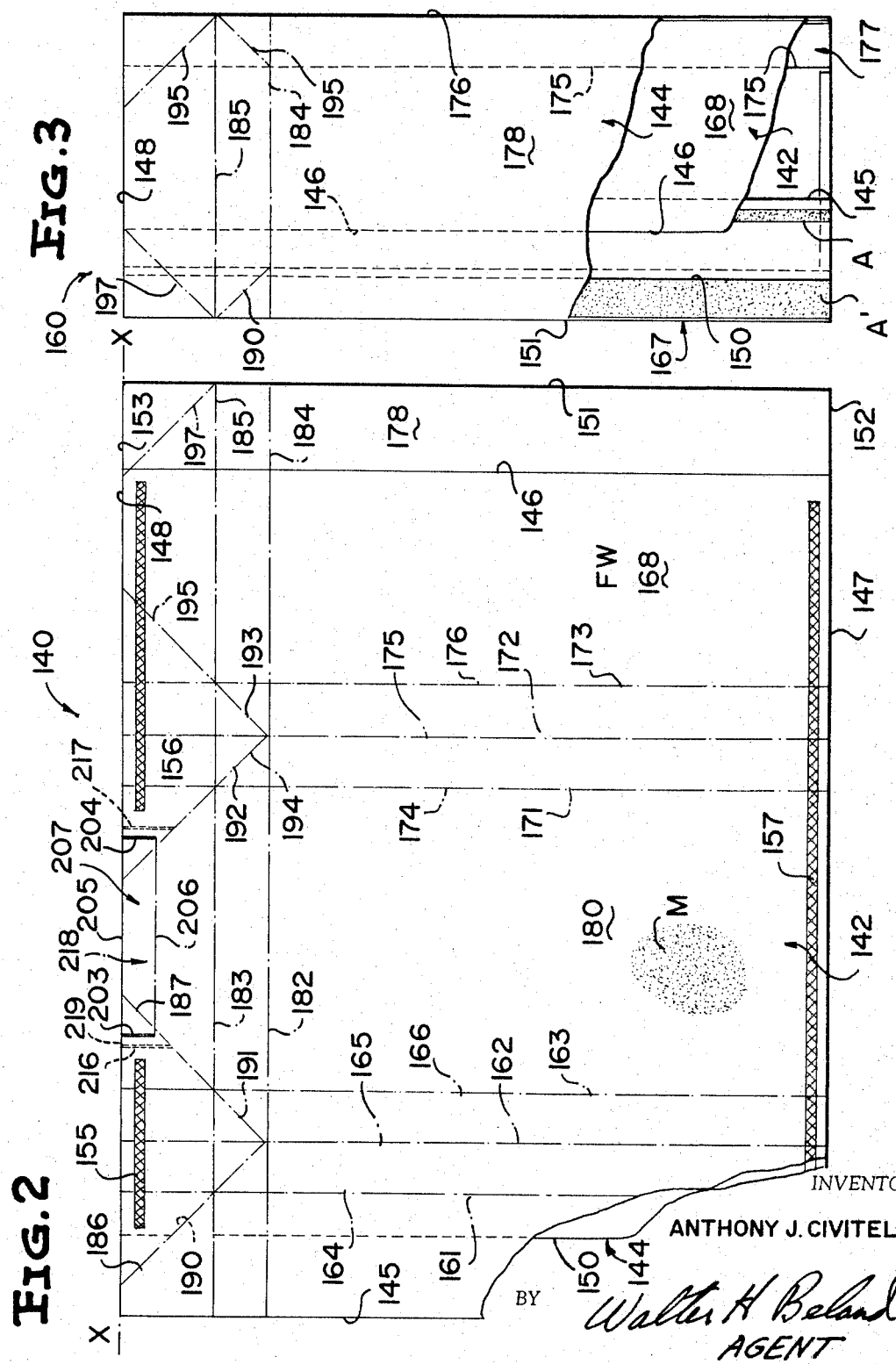
FIGURE 3 is a top plan view of the blank assembly of FIGURE 2 with parts broken away for clarity after the blank assembly has been folded into tube form, and illustrates staggered longitudinal seams of the bag.
Figure 4:
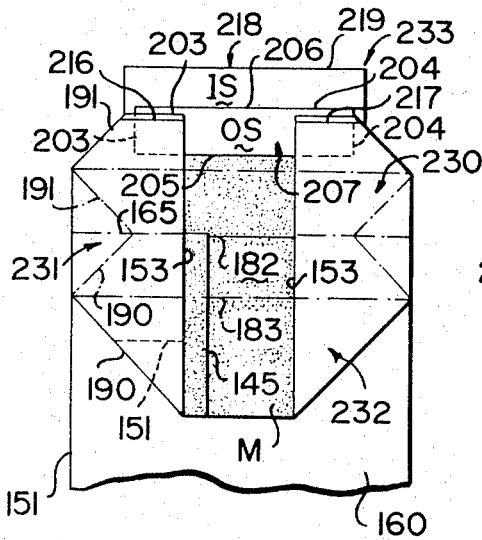
FIGURE 4 is a fragmentary top plan view of the flattened composite tube of FIGURE 3, and illustrates the bag bottom after a pair of tabs have been folded toward each other in a common plane and the foldable flap has been folded to expose a portion of an outer closure flap.
Figure 5:
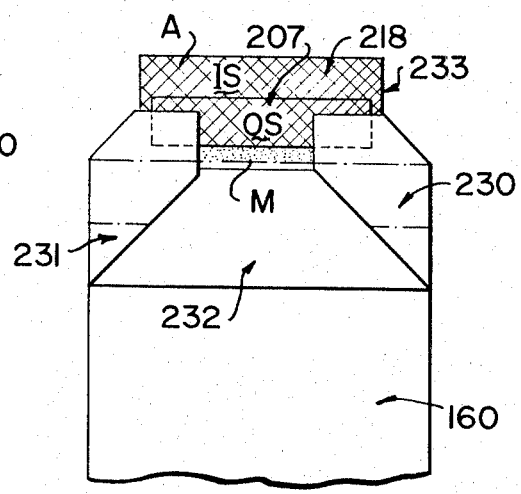
FIGURE 5 is a fragmentary top plan view of the composite tube of FIGURE 4, and illustrates the finally folded position of an inner closure flap of the bag bottom.
Figure 6:
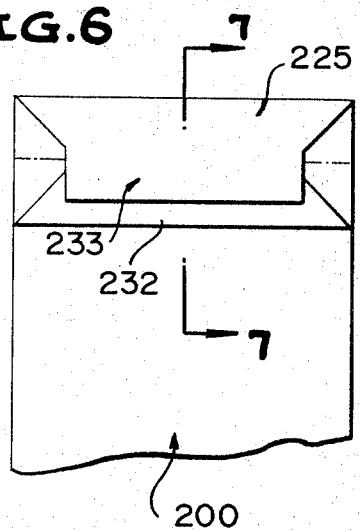
FIGURE 6 is a fragmentary top plan view of the completed multi-bag of this invention, and illustrates the overfolding of the outer closure flap into overlying relationship with the first folded inner closure flap.

After the blank assembly 140 of FIGURE 2 has been formed into the tube 160 of FIGURE 3 the folding mechanism 25 progressively folds the bottom portion of the tube 160 in the manner illustrated in FIGURES 4 and 5 of the drawings to form the completely folded bottom construction 225 of the multi-ply bag 200 of FIGURE 6. The initial folding of the tube 160 is illustrated in FIGURE 4 after the side gussets 167, and 177 have been formed and the bottom has been folded to define opposing closure tabs 230, 231, an inner first folded closure flap 232 and an outer last folded closure flap 233. Since the foldable flap 207 of the liner 142 was reversly folded about the fold or crease line 206 in the manner of the flaps 72, 73 prior to the overfolding of the tabs 230 and 231, the outermost uncoated surface OS (FIGURE 4) of the liner 142 in the area of the flap 207 is exposed between the closure tabs 230, 231 while an inner uncoated surface IS of the wrapper 144 in the area of the flap 218 is similarly exposed.

After adhesive has been applied to the tabs 230, 231, the inner closure flap 232 and the surfaces OS and IS of the respective foldable flaps 207 and 218, the closure flap 232 is folded to the position shown in FIGURE 5 in overlying adhesive contact with the tabs 230, 231. The outer closure flap 233 is then overfolded to the position illustrated in FIGURE 6 with the surfaces OS and IS of the respective portions 207 and 218 in adhesive overlying contact with the exterior surface of the inner closure flap 232. As was heretofore noted, the adhesive employed in effecting the seal of the bag bottom 225 is of a water-soluble type, such as animal glue. Such water-soluble adhesives do not readily adhere to impermeable material, such as the polyethylene coating M and do not set rapidly, if at all, because of the inability of the nonporous material to absorb the water of the water-soluble adhesive. However, by the overfolding of the flap 207 to shield a major portion of the material M at the bottom 225 (FIGURE 5) and to expose both of the porous uncoated surfaces OS and IS, substantially the entire area of the outer flap 233 is brought into adhesive bonding contact with the inner closure flap 232 in the absence of appreciable coating material M.

Figure 7:
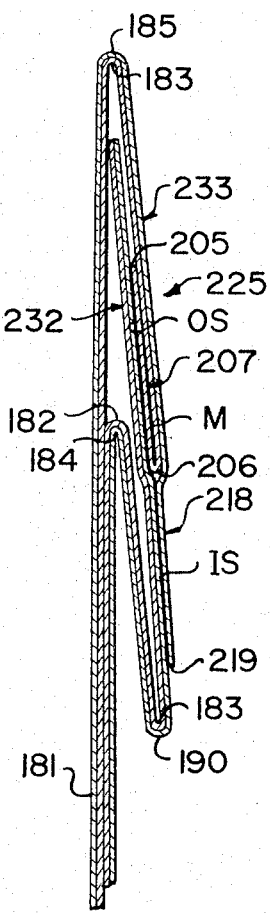
FIGURE 7 is an enlarged fragmentary sectional view taken along line 7—7 of FIGURE 6 and clearly illustrates the folded flap section of the outer closure flap which effects bonding between the closure flaps to the exclusion of coating material on the inner surface of the inner liner.

Referring to FIGURE 7 of the drawings, the effectiveness of the seal achieved by this invention at the bottom 225 of the multi-ply bag 220 is clearly evident. The uncoated inner surface IS coated with water-soluble adhesive A (also FIGURE 5) is in intimate adhesive contact with the outer surface of the inner closure flap 232 while the outer uncoated surface OS of the foldable flap 207 is similarly coated with water-soluble adhesive and is in sealing contact with the outer surface of the inner closure flap 232. The relatively impermeable non-porous coating material M is, however, shielded by the overfolded flap 207. In this manner, a seam is effected in the bag bottom 225 between the larger uncoated area portions thereof than heretofore provided in conventional bag bottom structures.

Referring to FIGURES 8 through 13 of the drawings, and FIGURE 8 in particular, another blank assembly 300 is illustrated and corresponds substantially identically to the blank assembly 140 except for two variations to be described fully hereafter. Except for these variations the blank assembly 300 is numbered identically to the blank assembly 140 of FIGURE 2.

The blank assembly 300 is formed from inner or liner webs and outer or wrapper webs corresponding to the webs 22 and 24 respectively of FIGURES 1–A and 1–B. As in the case of the blank assembly 140, a liner blank 301 (FIGURE 8) of the blank assembly 300 includes a pair of slits 303, 304 opening through a bottom edge 305 which is substantially coextensive with a bottom edge 306 of an outer or wrapper blank 307 except for an edge portion 308 between the slits 303, 304 projecting beyond the bottom edge 306 of the wrapper blank 307. A crease of fold line 310 joins the slits 303, 304 remote from the edge portion 308. The slits 303, 304 are positioned between a pair of slits 311, 312 formed in the wrapper blank 307 and opening through the bottom edge 306 thereof.

The slits 303, 304, the edge portion 308 and the crease or fold line 310 of the liner blank 301 define a generally rectangular foldable flap or section 315 corresponding to and formed in the same manner as the foldable flaps 72, 73 of FIGURES 1–A and 1–B with one exception i.e., the foldable flap 315 projects beyond the bottom edge 306 of the wrapper blank 307. This offsetting or projecting of the foldable flap 315 beyond the bottom edge 306 of the wrapper blank 307 is formed by the mechanism 25 after the web forming the liner blank 301 has been first perforated by a mechanism 320 (FIGURE 1–B). The mechanism 320 includes a roller backing roll 321 having a yieldable peripheral surface and an upper roll 322 carrying a pair of perforating elements 323, 324 spaced from each other a distance corresponding to the distance between the slits 303, 304. The roll 322 is driven in a conventional manner by the shaft 30 by means not shown to form a plurality of perforations in the liner web to each side of the foldable flap 315. The element 323 perforates a portion 316 of the liner blanks 301 between the slit 303 and a longitudinal edge 317 of the liner blank, while the element 324 perforates a portion 318 of the liner 301 between the slit 304 and an edge 320 of the liner blank. The lines of perforations 316, 318 and the edge 308 of the flap 315 combine to form the bottom edge 305 of the liner blank 301. The lines of perforation 316, 318 merely weaken the liner web and the mechanism 25 severs the same after the liner web has been joined with the wrapper web by advancing a leading portion of the unified webs at a faster speed than a trailing portion. This is accomplished by leading and trailing pairs of rollers (not shown) of the mechanism 25. The leading pair of rollers is driven more rapidly than the trailing pair of rollers and the unified webs are tensioned and ruptured along the lines of perforations 316, 318 to form the individual blank assemblies 300. The outer or wrapper blank 307 is similarly perforated by means corresponding to the means 320 which perforate the bottom edge 306 of the wrapper blank 307, causing the simultaneous severance thereof during the aforementioned tensioning of the unified webs.

The bottom edge 306 of the wrapper blank 307 is formed by perforated portions (unnumbered) to either side of a pair of slits 330, 331 in the wrapper blank 307 opening outwardly through the bottom edge 306 thereof. The slits 330, 331 are joined by a crease or fold line 332 parallel to and spaced from a straight cut edge portion 333 of the bottom edge 306. The slits 330, 331, the crease line 332 and the straight cut edge 333 define a generally rectangular foldable flap or section 335, corresponding to the foldable flap or section 315 in the liner blank 301.

The slits 330, 331 are formed in the wrapper blank 307 by the cutters 112, 113 of the severing means 105 (FIGURE 1–A) in the manner heretofore described with respect to the cutters 110, 111. The crease line 332 and the straight cut edge 333 are formed by the severing mechanism 130 as follows:

The severing mechanism 130 includes a backup roll 436 carrying a gear 437 in mesh with a gear 438 carried by the shaft 120 and driven by the means 115 in the manner heretofore described. The roll 436 is identical to the roll 64 of the severing means 57 and includes a gear corresponding to the gear 68 in mesh with a gear corresponding to the gear 70 (not shown) for driving a roll 440. The roll 440 includes a cutting element 441 for transversely severing the wrapper blank 307 while in one form along the edge 333 between the cut lines 330, 331 and a creasing element 442 for forming a crease corresponding to the crease 332 of FIGURE 8.

Folding means 443 corresponding to the folding means 75 include an element 444 adjustably supported on a shaft 445 secured at opposite end portions to a portion 446 of the framework (not shown) of the apparatus 20. The element 444 folds each of the foldable flaps 335 in a direction corresponding to the folding of the flaps 72, 73 i.e., a direction opposite to the direction of wrapper web travel whereby the flap 335 is underfolded in the manner best illustrated in FIGURES 9–11 of the drawings.

In FIGURE 9 of the drawings, the flap 335 is shown underfolded in a direction away from the bottom edges 305, 306 of the respective blanks 301, 307 after the same have been formed into a tube or tube assembly 340 and separated from the web to blank form in a manner heretofore described. The underfolding of the flap 335 exposes an outer uncoated rectangular surface portion of the liner blank 301 which is shown shaded in FIGURE 9 prior to the folding of the tube 340 and is generally referred to by the reference numeral 336. The folded flap 315 similarly exposes an uncoated inner surface portion 337 (FIGURE 10) of the outer wrapper shown shaded in FIGURE 10, and also exposes an uncoated outer surface 338 of the liner in the area of the folded flap 315.

The tube 340 is folded by the mechanism 25 in a conventional manner to form a square bottom 345 (FIGURES 12 and 13) of a multi-ply bag 350 by the apparatus 25 by first in-folding a pair of closure tabs 341, 342 (FIGURE 10), thereafter folding an inner closure flap 343 into overlying relationship to the tabs 341, 342 (FIGURE 11) and finally folding an outermost closure flap 344 (FIGURE 12) into overlying relationship with the inner closure flap 343.

In the completed form of the bag bottom 345, as is best illustrated in FIGURE 13 of the drawings, the uncoated inner surface portion 337 of the flap 344 is brought into overlying sealing relationship with the outer surface portion (unnumbered) of the inner closure flap 343 while the uncoated inner surface portion 338 of the folded flap 315 is brought into overlying sealing engagement with the uncoated outer surface portion 336 of the inner closure flap 343. This construction permits water-soluble adhesive to be absorbed by two opposing uncoated surface portions (336, 338) of the liner 301 and an uncoated surface portion 337 of the wrapper 307 with an exterior surface portion of the wrapper in the area of the flap 343 which may or may not be coated with material which is relatively impermeable to the water of a water-soluble adhesive. In this manner, a great porous uncoated area of each of the liner and wrapper blanks is presented to a water-soluble adhesive for effecting the setting-up thereof in a shorter period of time than heretofore provided for in conventional bag bottom constructions, and in addition, the greater exposure of the porous permeable material effects a more permanent and reliable seal in such construction.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. An apparatus for forming bags of the multi-ply type in which an effective seal is achieved at the bag bottom comprising means for feeding at least first and second webs in a predetermined direction of travel, severing means positioned adjacent one of the webs for forming a foldable flap portion therein, means for at least temporarily folding the foldable flap portion in a direction opposite to the direction of web travel, and means for forming the webs into multi-ply bags with the foldable flap portion occupying a position directed away from a terminal bottom edge of an associated bag.

2. An apparatus for forming bags of the multi-ply type comprising means for feeding at least first and second webs along predetermined paths and in predetermined directions of travel, first and second severing means positioned adjacent one of the webs for forming a foldable flap portion in the same, said first severing means including means for forming at least a pair of slits in said one web generally parallel to the predetermined direction of travel of said one web, said second severing means including cutting means for forming a slit between and generally normal to the pair of slits formed by said first severing means for defining therewith a generally foldable flap portion in said one web, means for at least temporarily folding the foldable flap portion in a direction opposite to the direction of web travel, and means for forming the webs into multi-ply bags with each flap portion occupying a position in an associated bag bottom.

3. The apparatus for forming bags as recited in claim 2 including means for moving the foldable flap portion out of the plane of said one web between the second severing means and the means for at least temporarily folding the foldable flap portion.

4. The apparatus for forming bags as defined in claim 3 wherein said means for moving the foldable flap portion comprises means for creasing said one web along a line between said pair of slits remote from and parallel to the slit joining the pair of slits whereby a generally rectangular foldable flap portion is deflected out of the plane of the web to define therein an opening.

5. An apparatus for forming bags of the multi-ply type comprising means for feeding at least first and second webs in predetermined directions of travel along predetermined paths, severing means positioned adjacent one of the webs for forming a foldable flap portion in the one web, said severing means including first and second cutting means, said first cutting means including at least a pair of cutters for forming a pair of slits in said one web in spaced parallel relationship to each other and to longitudinal edge portions of said one web, said second cutting means including a cutter for forming a slit generally normal to the direction of travel of said one web, means for operating the first and second cutting means in timed relationship to the feeding of the first and second webs whereby the pair of slits formed by the first cutting means is joined by the slit formed by the second cutting means to define a generally rectangular foldable flap portion in said one web, means for folding the foldable flap portion in a direction opposite to the direction of web travel, means for forming the webs into a tube with the foldable flap portion remaining folded in a direction opposite to the direction of web and tube travel, and means for forming the tube into a bag with the foldable flap portion occupying an area of the bag bottom.

6. The apparatus as defined in claim 5 including means for adusting the distance between the pair of slits formed by the first cutting means.

7. The apparatus for forming bags as defined in claim 5 including means for adjusting the length of each of the slits of the pair of slits.

8. The apparatus for forming bags as defined in claim 5 including creasing means for creasing said one web along a line between and joining said pair of slits parallel to and remote from said slit formed by the second cutting means whereby the foldable flap portion is deflected out of the plane of said one web.

9. Apparatus for forming bags of the multi-ply type comprising means for feeding at least inner and outer wabes in predetermined directions of travel along predetermined paths, severing means positioned adjacent the inner web for forming a foldable flap portion in said inner web, said severing means including first and second cutting means, said first cutting means including at least a pair of cutters normally spaced from but movable toward and against said inner web for forming a pair of spaced parallel slits therein, means for moving said cutters in timed relation to said feeding means, said second cutting means including a cutter for forming a slit between and generally normal to the pair of slits formed by said first cutting means, creasing means for creasing the inner web along a line parallel to and spaced from the slit formed by the second cutter means whereby the foldable flap portion is deflected out of the plane of the inner wab, means for folding the foldable flap portion along the line formed by the creasing means in a direction opposite to the direction of inner web travel, and means for forming the inner and outer webs into a bag with the still folded foldable flap portion occupying an area of the bag bottom.

10. An apparatus for forming bags of the multi-ply type in which an effective seal is achieved at the bag bottom comprising means for feeding inner and outer webs in predetermined directions of travel along predetermined paths, severing means positioned adjacent each of the webs, each of the severing means including first and second cutting means, each of the first cutting means including slitters for forming at least a pair of slits in generally parallel spaced relationship to each other and to longitudinal edge portions of the respective webs, each of the second cutting means including a cutter for forming a slit generally normal to and between the associated pair of slits in each web for defining in each web a foldable flap portion, means for folding each of the foldable flap portions of the inner and outer webs in a direction opposite to the directions of web travel, and means for forming the webs into bags having opposed flaps and tabs with the foldable flap portions occupying areas of the opposing flaps.

11. A method of forming multi-ply bags comprising the steps of feeding at least first and second webs along predetermined paths of travel in predetermined directions, forming a generally rectangular foldable flap portion in one of the webs, folding the foldable flap portion out of the plane of the one web in a direction opposite to the direction of web travel to bring the foldable flap portion in generally overlaying relationship to the one web, and forming the webs into a bag having a bottom defined in part by the reversely folded foldable flap portion.

12. A method of forming multi-ply bags comprising the steps of feeding inner and outer webs along predetermined paths of travel in predetermined directions, cutting a pair of slits in the inner web in generally spaced parallel relationship to each other and to longitudinal edge portions of the inner web, slitting the inner web between and generally normal to the pair of slits to define a generally rectangular foldable flap portion in the inner web, deflecting the foldable flap portions of the plane of the inner web, reversely folding the foldable flap portion in a direction opposite to the direction of travel of the inner web, and forming the webs into a bag having a bottom partially defined by the reversely folded foldable flap portion.

13. The method of forming a multi-ply bag as defined in claim 12 including the steps of forming a substantially identical foldable flap portion in the outer web, and aligning the foldable flap portions of the inner and outer webs prior to the formation thereof into a bag.

References Cited

UNITED STATES PATENTS

| | | | |
|---|---|---|---|
| 2,600,487 | 6/1952 | Craig | 229—59 |
| 2,847,914 | 8/1958 | Davis | 93—14 |
| 2,957,394 | 10/1960 | Williams | 93—35 |

BERNARD STICKNEY, *Primary Examiner.*